(12) United States Patent
Oka

(10) Patent No.: US 12,184,338 B2
(45) Date of Patent: Dec. 31, 2024

(54) OPTICAL 90-DEGREE HYBRID

(71) Applicant: FUJITSU OPTICAL COMPONENTS LIMITED, Kawasaki (JP)

(72) Inventor: Akira Oka, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 26 days.

(21) Appl. No.: 17/991,263

(22) Filed: Nov. 21, 2022

(65) Prior Publication Data

US 2023/0208529 A1 Jun. 29, 2023

(30) Foreign Application Priority Data

Dec. 28, 2021 (JP) ................................. 2021-214827

(51) Int. Cl.
| | |
|---|---|
| *H04B 10/61* | (2013.01) |
| *G02B 6/42* | (2006.01) |
| *G02B 27/10* | (2006.01) |
| *G02F 1/21* | (2006.01) |
| *G02F 1/225* | (2006.01) |

(52) U.S. Cl.
CPC ......... *H04B 10/615* (2013.01); *G02B 6/4206* (2013.01); *G02B 27/10* (2013.01); *G02F 1/217* (2021.01); *G02F 1/225* (2013.01)

(58) Field of Classification Search
CPC ....... H04B 10/615; G02F 1/217; G02F 1/225; G02B 27/10
See application file for complete search history.

(56) References Cited

U.S. PATENT DOCUMENTS

| | | | |
|---|---|---|---|
| 8,401,351 B2 * | 3/2013 | Inoue | H04B 10/612 |
| | | | 359/325 |
| 10,731,383 B2 | 8/2020 | Yamazaki | |
| 2012/0141067 A1 | 6/2012 | Sakamaki et al. | |

(Continued)

FOREIGN PATENT DOCUMENTS

| | | |
|---|---|---|
| JP | 2011-18002 | 1/2011 |
| JP | 2020-177109 | 10/2020 |

(Continued)

OTHER PUBLICATIONS

Soldano, L. et al., "Optical Multi-Mode Interference Devices Based on Self-Imaging: Principles and Applications", IEEE, Journal of Lightwave Technology, vol. 13, No. 4, Apr. 1995, pp. 615-627.

(Continued)

*Primary Examiner* — Nathan M Cors
(74) *Attorney, Agent, or Firm* — STAAS & HALSEY LLP

(57) ABSTRACT

An optical 90-degree hybrid includes two splitters, two combiners and four arm waveguides that connect output ports of the splitters and input ports of the combiners. Each of the splitters, the arm waveguides, and the combiners is a part of an optical waveguide. The optical waveguide is configured so that the phase error generated in the splitters due to wavelength change is suppressed by the phase error generated in the arm waveguides due to the wavelength change. The optical waveguide is further configured so that the phase error generated in the splitters due to deviation of a structure parameter from a certain value (e.g., design value) is suppressed by the phase error generated in the arm waveguides due to the deviation.

4 Claims, 13 Drawing Sheets

(56) References Cited

U.S. PATENT DOCUMENTS

| | | | | |
|---|---|---|---|---|
| 2012/0237154 A1* | 9/2012 | Jeong | .................. | G02B 6/12 |
| | | | | 385/14 |
| 2020/0096699 A1* | 3/2020 | Ma | .................. | H04B 10/61 |
| 2021/0294038 A1* | 9/2021 | Oka | .................. | G02B 6/2813 |
| 2022/0171127 A1* | 6/2022 | Jizodo | .................. | H04B 10/61 |

FOREIGN PATENT DOCUMENTS

| | | |
|---|---|---|
| JP | 2021-148965 | 9/2021 |
| WO | WO2011/010469 | 1/2011 |

OTHER PUBLICATIONS

Chang, W. et al., "Inverse design and demonstration of an ultracompact broadband dual-mode 3 dB power splitter", Optics Express 24135, vol. 26, No. 18, Sep. 3, 2018 (10 pp.).

* cited by examiner

OPTICAL 90-DEGREE HYBRID

CROSS-REFERENCE TO RELATED APPLICATION

This application is based upon and claims the benefit of priority of the prior Japanese Patent Application No. 2021-214827, filed on Dec. 28, 2021, the entire contents of which are incorporated herein by reference.

FIELD

The embodiments discussed herein are related to an optical 90-degree hybrid.

BACKGROUND

Optical 90-degree hybrids are optical devices that generate four interference lights (i.e., lights generated by the interference of lights) with phase intervals of 90° from a signal light and a reference light that has approximately the same wavelength as that of the signal light (see Japanese Laid-open Patent Publication No. 2020-177109, U.S. patent Ser. No. 10/731,383, Japanese Laid-open Patent Publication No. 2011-18002, International Publication Pamphlet No. WO 2011/010469, and Japanese Laid-open Patent Publication No. 2021-148965, for example). The optical 90-degree hybrids are used in, for example, receivers in digital coherent optical communication that enables high-speed and large-capacity communication. Interference lights outputted from an optical 90-degree hybrid are converted by balanced photodetectors into two electrical signals of which the phases differ by approximately 90° from each other. Two orthogonal transmission signals are demodulated from these electrical signals.

The optical 90-degree hybrid splits each of the signal light and the reference light into two, and imparts separate phases to the splitted reference light (or signal light). One of the splitted reference lights and one of the splitted signal lights are thereafter combined, and further the other of the splitted reference lights and the other of the splitted signal lights are combined, thereby generating four interference lights with phase intervals of approximately 90°.

Deviation of phase difference of the interference lights from 90° degrades the orthogonality of the two electrical signals obtained from the interference lights, and the waveform of the demodulated signals deteriorate as a result. Accordingly, maximally small deviation in phase difference of interference lights from 90° is desirable. Hereinafter, the deviation in phase difference of interference lights from 90° is referred to as phase error.

Now, as the wavelength of the signal light changes together with that of the reference light, the phase error of interference lights also changes. Accordingly, technology has been proposed to maintain the phase error of interference lights at approximately 0° even when the wavelength of the signal light changes together with that of the reference light (see Japanese Laid-open Patent Publication No. 2011-18002, International Publication Pamphlet No. WO 2011/010469, and Japanese Laid-open Patent Publication No. 2021-148965, for example). This technology is important in wavelength-multiplexed communication (particularly in wavelength-multiplexed communication using broad wavelength ranges such as C-band).

The phase error of interference lights also changes when the width or the like of an optical waveguide included in the optical 90-degree hybrid deviates from the design value. Increase in deviation from the design value (i.e., manufacturing error) results in a larger phase error. Thus, technology has been proposed in which the phase error of interference lights is maintained at approximately 0° even when manufacturing error is great (see Japanese Laid-open Patent Publication No. 2021-148965, for example).

Now, many optical 90-degree hybrids split (or combine) signal light and reference light by multimode interference waveguides or the like, for example (see Lucas. B. Sodano and Erik C. M. Pennings, "Optical Multi-Mode Interference Devices Based on Self-Imaging", JOURNAL OF LIGHTWAVE TECHNOLOGY, vol. 13, no. 4, April 1995, pp. 615-627, for example). Various types of elements other than multimode interference waveguides are being proposed as optical elements for splitting (or combining) light (see Weijie Chang, et al., "Inverse design and demonstration of an ultracompact broadband dual-mode 3 dB power splitter", Optics Express, Vol. 26, No. 18, 2018, pp. 24135-24144, for example).

SUMMARY

According to an aspect of the embodiments, an optical 90-degree hybrid includes: a first splitter that has a first output port, and a second output port that is different from the first output port; a second splitter that is different from the first splitter and that has a third output port, and a fourth output port that is different from the third output port; a first combiner that has a first input port, and a second input port that is different from the first input port; a second combiner that is different from the first combiner and that has a third input port, and a fourth input port that is different from the third input port; a first arm waveguide that connects the first output port and the third input port; a second arm waveguide that connects the second output port and the second input port; a third arm waveguide that connects the third output port and the first input port; and a fourth arm waveguide that connects the fourth output port and the fourth input port, wherein the first splitter splits a first light into a first split light and a second split light, outputs the first split light from the first output port, and outputs the second split light from the second output port, the second splitter splits a second light into a third split light and a fourth split light, outputs the third split light from the third output port, and outputs the fourth split light from the fourth output port, the first combiner combines the second split light that enters thereto via the second arm waveguide and the third split light that enters thereto via the third arm waveguide so as to generate a first interference light and a second interference light that is opposite in phase to the first interference light, the second combiner combines the fourth split light that enters thereto via the fourth arm waveguide and the first split light that enters thereto via the first arm waveguide so as to generate a third interference light and a fourth interference light that is opposite in phase to the third interference light, each of the first and second splitters, the first to fourth arm waveguides, and the first and second combiners is a part of an optical waveguide that has a core and a cladding that surrounds the core, and the optical waveguide is configured to satisfy following Expressions (1) to (7) in a case in which $\lambda$ is a certain wavelength and X is zero, the X being deviation of a parameter from a first value, the parameter being based on a size of a cross-section of the core or a shape of the cross-section,

[Math. 1]
$$\frac{\partial \epsilon_1}{\partial \lambda} > 0 \quad (1)$$

[Math. 2]
$$\frac{\partial \epsilon_2}{\partial \lambda} > 0 \quad (2)$$

[Math. 3]
$$\frac{\partial \Phi}{\partial \lambda} < 0 \quad (3)$$

[Math. 4]
$$\frac{\partial \epsilon_1}{\partial X} < 0 \quad (4)$$

[Math. 5]
$$\frac{\partial \epsilon_2}{\partial X} < 0 \quad (5)$$

[Math. 6]
$$\frac{\partial \Phi}{\partial X} > 0 \quad (6)$$

[Math. 7]
$$\Phi + (\epsilon_1 + \epsilon_2) = k \times \pi/2 + 2m\pi \quad (7)$$

[Math. 8]
$$\Phi = (\Phi 1 - \Phi 4) - (\Phi 2 - \Phi 3) \quad (8)$$

Where $\lambda$ is a wavelength of the first light and the second light, the cross-section is a cross-section perpendicular to a travelling direction of a light propagated through the core, $\epsilon_1$ is a difference obtained by subtracting a second phase of an electric field of the second split light from a first phase of an electric field of the first split light, the first phase is a phase at the first output port, the second phase is a phase at the second output port, $\epsilon_2$ is a difference obtained by subtracting a fourth phase of an electric field of the fourth split light from a third phase of an electric field of the third split light, the third phase is a phase at the third output port, the fourth phase is a phase at the fourth output port, $\Phi$ is a phase imparted by Expression (8), $\Phi 1$ is a phase imparted to the first split light by the first arm waveguide, $\Phi 2$ is a phase imparted to the second split light by the second arm waveguide, $\Phi 3$ is a phase imparted to the third split light by the third arm waveguide, $\Phi 4$ is a phase imparted to the fourth split light by the fourth arm waveguide, m is an integer, k is either +1 or −1, and a unit of phases is radian.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As described previously, technology has been proposed to maintain the phase error of interference lights at approximately 0° even when the wavelength of the signal light changes together with that of the reference light. However, the related art has a problem in that even if increase in the phase error due to wavelength change (i.e., change in wavelength) can be suppressed, the phase error increases when manufacturing error increases.

According to one aspect of the embodiments, increase in the phase error due to increase in deviation of a structural parameter (more accurately, increase in absolute value of the deviation) can be suppressed, while suppressing increase in the phase error (more accurately, increase in absolute value of the phase error) due to wavelength change. Here, an example of the deviation of the structural parameter is manufacturing error.

Embodiments of the present invention will be described hereinafter according to drawings. However, it is noted that the technical scope is not limited to the embodiments described below, but covers the matters described in the claims and the equivalents thereof. Here, identical symbols are given to identical parts even in different drawings, and the description thereof will be omitted.

(1) Description of Optical 90-Degree Hybrid

Figure 1:
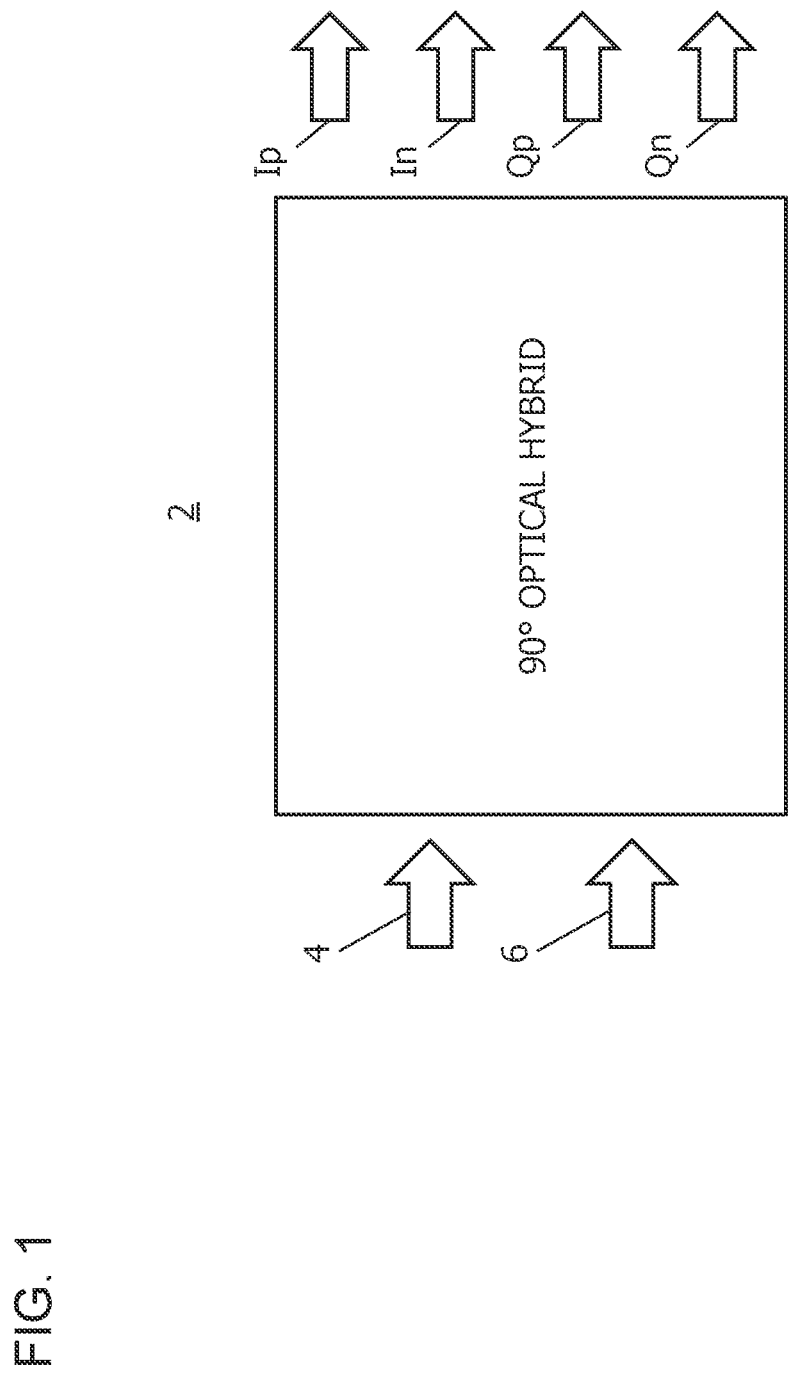
FIG. 1 is a diagram for describing features of an optical 90-degree hybrid 2.

FIG. 1 is a diagram for describing features of an optical 90-degree hybrid 2. The optical 90-degree hybrid 2 is a device that is configured to perform, upon receiving two lights 4 and 6 of which the wavelengths are the same, mixing the two lights 4 and 6, and outputting four interference lights Ip, In, Qp, and Qn with phase intervals of approximately 90°. The absolute value of phase difference between the interference light Ip and the interference light In is approximately 180°. The absolute value of phase difference between the interference light Qp and the interference light Qn is approximately 180°. The absolute value of phase difference between the interference light Ip and the interference light Qp is approximately 90° (preferably no less than 85° and no more than 95°). The absolute value of phase difference between the interference light In and the interference light Qn is approximately 90° (preferably no less than 85° and no more than 95°). Phase difference between interference lights means phase difference in light intensity (i.e., power) of the interference lights. The optical 90-degree hybrids according to the embodiment are devices that have these features.

(2) Structure and Operations

Figure 2:
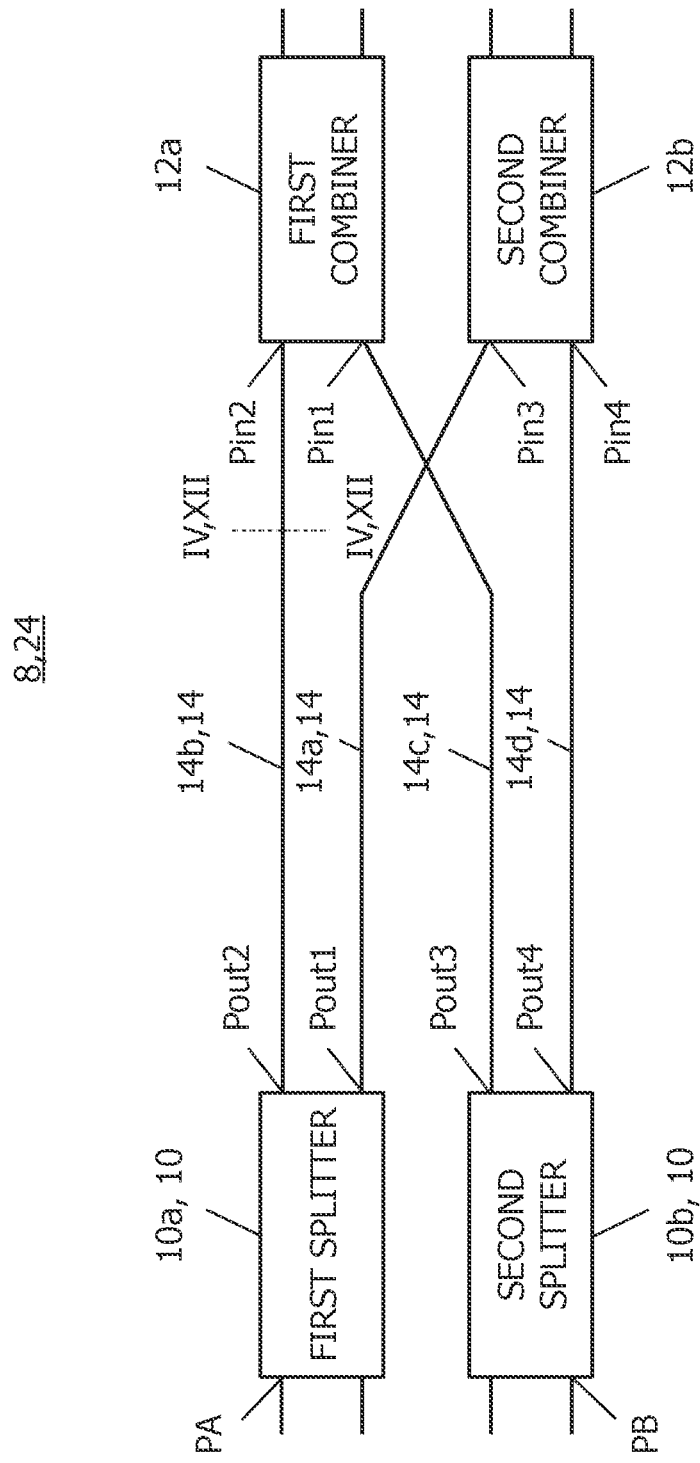
FIG. 2 is a diagram illustrating an example of an optical 90-degree hybrid 8 according to the embodiment.
Figure 3:
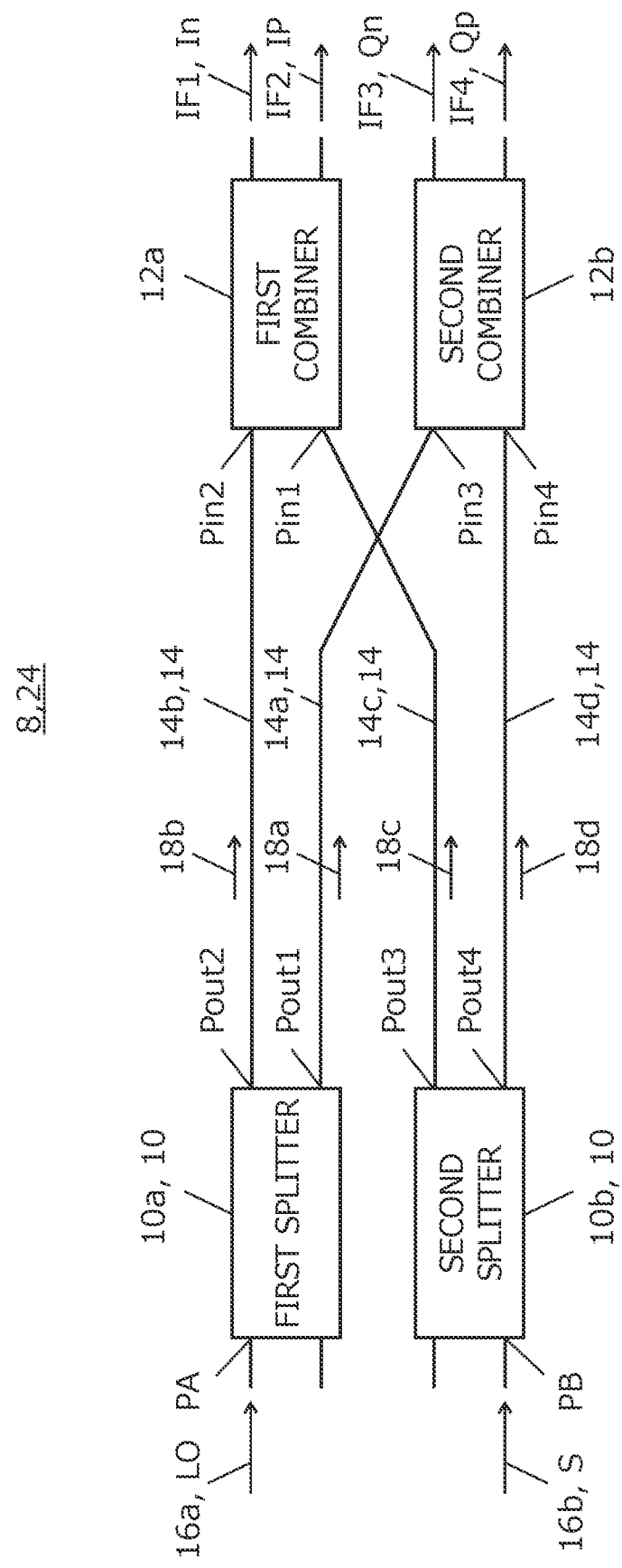
FIG. 3 is a diagram for describing operations of the optical 90-degree hybrid 8.
Figure 4:
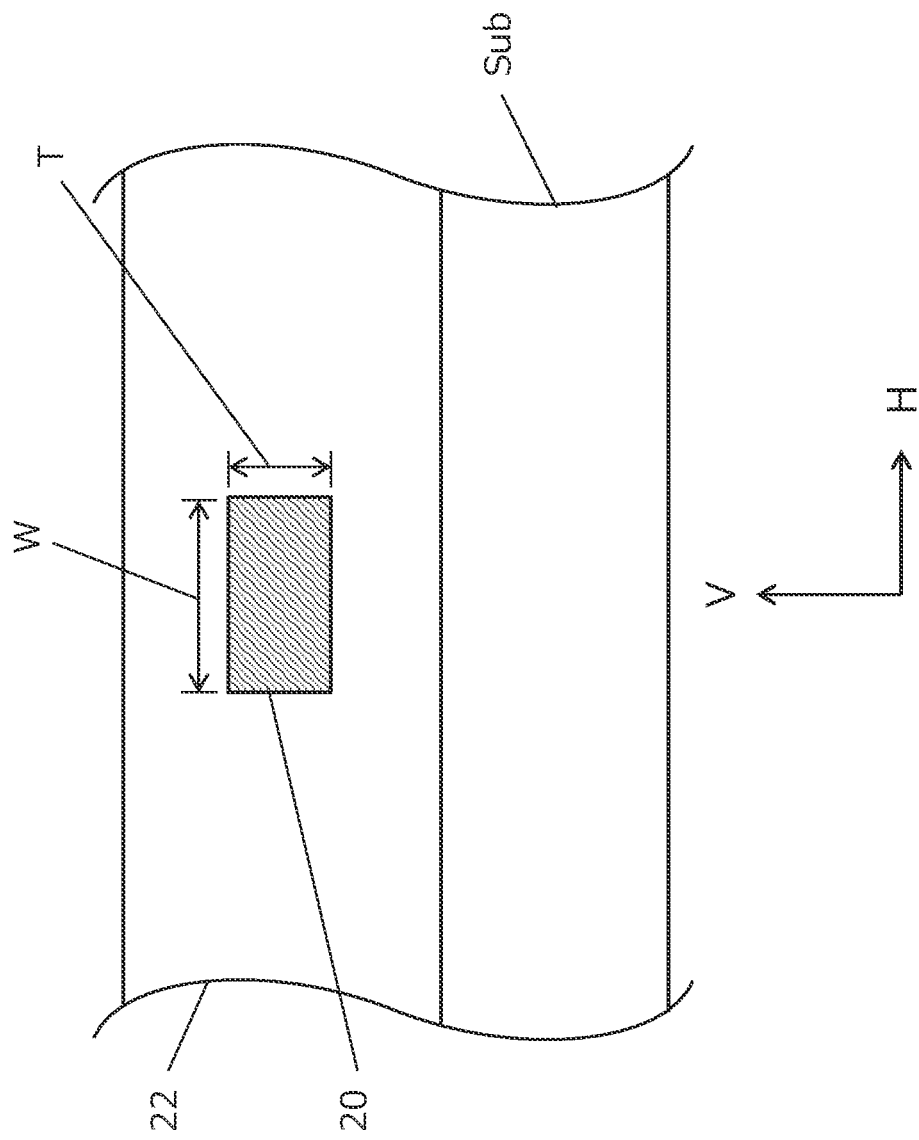
FIG. 4 is a cross-sectional view taken along line IV, XII-IV, XII in FIG. 2.

FIG. 2 is a diagram illustrating an example of an optical 90-degree hybrid 8 according to the embodiment. FIG. 3 is a diagram for describing operations of the optical 90-degree hybrid 8. FIG. 4 is a cross-sectional view taken along line IV, XII-IV, XII in FIG. 2.

The optical 90-degree hybrid 8 includes a first splitter 10*a* that has a first output port Pout1 and a second output port Pout2. The first splitter 10*a* is a 2×2 multimode interferometer, for example. The term "2×2 multimode interferometer" will be abbreviated to "2×2 MMI" hereinafter. The second output port Pout2 is, for example, a through port to an input port PA to which a later-described first input light 16*a* (see FIG. 3) enters (i.e., an output port facing the input port PA). The first output port Pout1 is, for example, a cross-port with respect to the input port PA (i.e., another output port that is separate from the through port).

The optical 90-degree hybrid 8 further includes a second splitter 10*b* that has a third output port Pout3 and a fourth output port Pout4. The second splitter 10*b* is a 2×2 MMI, for example. The fourth output port Pout4 is, for example, a through port to an input port PB to which a later-described second input light 16*b* enters (i.e., an output port facing the input port PB). The third output port Pout3 is, for example, a cross-port with respect to the input port PB.

The optical 90-degree hybrid 8 further includes a first combiner 12*a* that has a first input port Pin1 and a second input port Pin2. The first combiner 12*a* is a 2×2 MMI, for example.

The optical 90-degree hybrid 8 further includes a second combiner 12*b* that has a third input port Pin3 and a fourth input port Pin4. The second combiner 12*b* is a 2×2 MMI, for example.

The optical 90-degree hybrid 8 further includes a first arm waveguide 14*a* that connects the first output port Pout1 and the third input port Pin3. The optical 90-degree hybrid 8 further includes a second arm waveguide 14*b* that connects the second output port Pout2 and the second input port Pin2. The optical 90-degree hybrid 8 further includes a third arm waveguide 14*c* that connects the third output port Pout3 and the first input port Pin1. The optical 90-degree hybrid 8 further includes a fourth arm waveguide 14*d* that connects the fourth output port Pout4 and the fourth input port Pin4. The first to fourth arm waveguides 14*a*, 14*b*, 14*c*, and 14*d* are channel waveguides, for example.

The first splitter 10*a* (see FIG. 3) splits a first light 16*a* (hereinafter referred to as first input light) into a first split light 18*a* and a second split light 18*b*, outputs the first split light 18*a* from the first output port Pout1, and outputs the second split light 18*b* from the second output port Pout2. The first split light 18*a* and the second split light 18*b* are lights obtained by the above splitting of the first input light 16*a*. The first input light 16*a* is a reference light LO, for example.

The second splitter 10*b* splits a second light 16*b* (hereinafter referred to as second input light) into a third split light 18*c* and a fourth split light 18*d*, outputs the third split light 18*c* from the third output port Pout3, and outputs the fourth split light 18*d* from the fourth output port Pout4. The third split light 18*c* and the fourth split light 18*d* are lights obtained by the above splitting of the second input light 16*b*. The second input light 16*b* is a signal light S, for example.

The first combiner 12*a* combines the second split light 18*b* that enters thereto via the second arm waveguide 14*b* and the third split light 18*c* that enters thereto via the third arm waveguide 14*c* so as to generate a first interference light IF1 and a second interference light IF2. The first combiner 12*a* outputs the first interference light IF1, which is generated, and the second interference light IF2, which also is generated. The second interference light IF2 is an interference light that is opposite in phase to the first interference light IF1. The first interference light IF1 and the second interference light IF2 are lights generated by interference between the second split light 18*b* and the third split light 18*c*. The first interference light IF1 is the interference light In described with reference to FIG. 1. The second interference light IF2 is the interference light Ip described with reference to FIG. 1.

The second combiner 12*b* combines the fourth split light 18*d* that enters thereto via the fourth arm waveguide 14*d* and the first split light 18*a* that enters thereto via the first arm waveguide 14*a* so as to generate a third interference light IF3 and a fourth interference light IF4. The second combiner 12*b* outputs the third interference light IF3, which is generated, and the fourth interference light IF4, which also is generated. The fourth interference light IF4 is an interference light that is opposite in phase to the third interference light IF3. The third interference light IF3 and the fourth interference light IF4 are lights generated by interference between the fourth split light 18*d* and the first split light 18*a*. The third interference light IF3 is the interference light Qn described with reference to FIG. 1. The fourth interference light IF4 is the interference light Qp described with reference to FIG. 1.

Each of the first and second splitters 10*a* and 10*b*, the first to fourth arm waveguides 14*a*, 14*b*, 14*c*, and 14*d*, and the first and second combiners 12*a* and 12*b* is a part of an optical waveguide 24 that has a core 20 (see FIG. 4) and cladding 22 that surrounds the core 20. The cladding 22 is a member that has a lower refractive index than that of the core 20.

The optical waveguide 24 is an optical element that is configured to satisfy the following Expressions (1) to (7) in a case in which a wavelength λ is a certain wavelength and X is zero. Here, the variable X is deviation of a structural parameter (e.g., width W of the core 20) from a first value (e.g., design value). This case (i.e., the wavelength λ is a certain wavelength and X is zero) will be referred to as "optimal conditions" hereinafter.

[Math. 9]

$$\frac{\partial \epsilon_1}{\partial \lambda} > 0 \quad (1)$$

[Math. 10]

$$\frac{\partial \epsilon_2}{\partial \lambda} > 0 \quad (2)$$

[Math. 11]

$$\frac{\partial \Phi}{\partial \lambda} < 0 \quad (3)$$

[Math. 12]

$$\frac{\partial \epsilon_1}{\partial X} < 0 \quad (4)$$

-continued

[Math. 13]

$$\frac{\partial \epsilon_2}{\partial X} < 0 \quad (5)$$

[Math. 14]

$$\frac{\partial \Phi}{\partial X} > 0 \quad (6)$$

[Math. 15]

$$\Phi + (\epsilon_1 + \epsilon_2) = k \times \pi/2 + 2m\pi \quad (7)$$

[Math. 16]

$$\Phi = (\Phi 1 - \Phi 4) - (\Phi 2 - \Phi 3) \quad (8)$$

Note however, that λ is the wavelength of the first input light 16a and the second input light 16b (the same hereinafter). "Structural parameter" is a parameter based on the size of a cross-section of the core 20, or the shape of this cross-section. This "cross-section" is a cross-section perpendicular to the travelling direction (in other words, path) of a light propagated through the core 20 (see FIG. 4).

A parameter based on the "size of a cross-section of the core" is, for example, dimensions of the core 20 (e.g., width W of the core 20 or thickness T of the core 20). A parameter based on the "shape of this cross-section" is, for example, an angle between a side wall and a bottom face of the core 20 (i.e., sidewall angle).

The width W of the core 20 is a dimension of the above "cross-section" (i.e., a cross-section perpendicular to the travelling direction of a light propagated through the core 20), and is a dimension in a direction H parallel to a substrate Sub on which the optical waveguide 24 is disposed. The thickness T of the core 20 is a dimension of the above "cross-section", and is a dimension in a direction V perpendicular to the substrate Sub on which the optical waveguide 24 is disposed.

As described above, the "first value" is, for example, a design value used in manufacturing the optical 90-degree hybrid 8 (i.e., a target value for a structural parameter that is obtained as a result of the design of the optical 90-degree hybrid 8). The above "deviation" is, for example, manufacturing error. The manufacturing error is, for example, a difference between a design value A of the width W (or the thickness T) of the core 20 and an actual value B of the width W (or the thickness T) of the core 20, the difference being B minus A. In many cases, the manufacturing error is nearly constant irrespective of the position in the element.

A value x of the structural parameter is a value obtained by adding deviation X to the above "first value" $X_0$. In other words, the value x of the structural parameter can be expressed by $x=X_0+X$. Thus, the actual value of the structural parameter for the optical waveguide 24 is a value (e.g., 1.161 μm) obtained by adding a certain deviation (e.g., manufacturing error 25 nm) to the first value $X_0$ (e.g., design value 1.136 μm). The certain deviation can be a variety of values. (e.g., −25 nm, 0 nm, +25 nm, etc.).

The "first value" $X_0$ changes along each path of the first input light 16a, the second input light 16b, and the first to fourth split lights 18a, 18b, 18c, and 18d. For example, the first value $X_0$ (e.g., design value) for core width of the first splitter 10a is greater than the first value $X_0$ (e.g., design value) for core width of the first arm waveguide 14a. The "core width" means the width of the core.

$\epsilon_1$ is a difference obtained by subtracting a second phase Ph2 of the electric field of the second split light 18b from a first phase Ph1 of the electric field of the first split light 18a (i.e., Ph1 minus Ph2). Note that the first phase Ph1 is the phase at the first output port Pout1. The second phase Ph2 is the phase at the second output port Pout2.

$\epsilon_2$ is a difference obtained by subtracting a fourth phase Ph4 of the electric field of the fourth split light 18d from a third phase Ph3 of the electric field of the third split light 18c (i.e., Ph3 minus Ph4). Note that the third phase Ph3 is the phase at the third output port Pout3. The fourth phase Ph4 is the phase at the fourth output port Pout4.

Φ is a phase imparted by Expression (8). Φ1 is a phase imparted to the first split light 18a by the first arm waveguide 14a (i.e., the change amount generated in the phase of the first split light 18a due to the first split light 18a passing through the first arm waveguide 14a, hereinafter the same). Φ2 is a phase imparted to the second split light 18b by the second arm waveguide 14b. Φ3 is a phase imparted to the third split light 18c by the third arm waveguide 14c. Φ4 is a phase imparted to the fourth split light 18d by the fourth arm waveguide 14d. m is an integer. k is either +1 or −1. The unit of phases is radian, unless specified otherwise (hereinafter the same). Note that the above "phase" does not include ωt (where ω is angular frequency of light, and t is time) that changes over time.

$\epsilon_1$ and $\epsilon_2$, and Φ1 to Φ4 are functions of λ and X. Note that $\epsilon_1$ and $\epsilon_2$, and Φ1 to Φ4 are functions obtained in a case in which the wavelength of the first input light 16a and the wavelength of the second input light 16b are coincident with each other.

The first combiner 12a and the second combiner 12b are supposed to be 2×2 MMIs having the same configuration in the following description. However, the conclusion described below will be unchanged even when the first combiner 12a and the second combiner 12b are not 2×2 MMIs having the same configuration. Note that the first combiner 12a is an optical element configured to output the first interference light IF1, and the second interference light IF2 that is opposite in phase to the first interference light IF1. In the same way, the second combiner 12b is an optical element configured to output the third interference light IF3, and the fourth interference light IF4 that is opposite in phase to the third interference light IF3.

Expression (9) gives the phase difference ΔP between the second interference light IF2 (i.e., interference light Ip) and the fourth interference light IF4 (i.e., interference light Qp).

[Math. 17]

$$\Delta P = \{(\Phi 2 - \Phi 3) - (\Phi 1 - \Phi 4)\} - (\epsilon_1 + \epsilon_2) \quad (9)$$

It can be understood from Expression (7) that when the wavelength λ is the aforementioned "certain wavelength", and the above structural parameter is coincident with the first value, the phase difference ΔP will be −k×η/2 −2 mη (where k is 1 or −1, and m is an integer). However, when the structural parameter is deviated from the first value, or the wavelength λ is deviated from the "certain wavelength", the phase difference ΔP will change and become −k×η/2 −2 mη −Δθ. Δθ will be referred to as "phase error" hereinafter. Accordingly, this yields Expression (10).

[Math. 18]

$$\{(\Phi 2 - \Phi 3) - (\Phi 1 - \Phi 4)\} - (\epsilon_1 + \epsilon_2) = -k \times \frac{\pi}{2} - 2m\pi - \Delta\theta \quad (10)$$

Now, with k=−1 and m=0, the phase error Δθ can be expressed as in Expression (11).

[Math. 19]

$$\Delta\theta = \Phi + (\epsilon_1 + \epsilon_2) + \frac{\pi}{2} \quad (11)$$

The conclusion described below will be unchanged even when other than k=−1 and m=0. Φ is the function represented by Expression (8).

Expression (12) represents the total derivative δ(Δθ) of the phase error Δθ.

[Math. 20]

$$\delta(\Delta\theta) = \left\{ \frac{\partial\Phi}{\partial\lambda} + \frac{\partial(\epsilon_1 + \epsilon_2)}{\partial\lambda} \right\} \cdot \delta\lambda + \left\{ \frac{\partial\Phi}{\partial X} + \left( \frac{\partial(\epsilon_1 + \epsilon_2)}{\partial X} \right) \right\} \cdot \delta X \quad (12)$$

Note that δλ is the change amount (i.e., amount of change) of Δ. δX is the change amount of X.

The coefficient of δλ a in Expression (12) is the sum of a partial derivative of Φ as to λ and a partial derivative of ε$_1$+ε$_2$ as to λ. In a case in which λ is the certain wavelength and deviation X is zero (i.e., the aforementioned "optimal conditions"), partial derivative of Φ as to λ and a partial derivative of ε$_1$+ε$_2$ as to λ are of opposite signs from each other, which can be understood from Expressions (1) to (3). Thus, in a case in which λ is the above "certain wavelength" and deviation X is zero, the coefficient of δλ in Expression (12) becomes small. The same can be said for the coefficient of δX in Expression (12).

Thus, according to the present embodiment, increase in the phase error Δθ due to the deviation X (e.g., manufacturing error) increasing (more accurately, the absolute value of deviation X increasing) can be suppressed, while suppressing change in the phase error Δθ due to change in the wavelength λ (i.e., wavelength dependency of phase error). Note that in a case in which λ is the above "certain wavelength" and the deviation X is zero, the coefficient of δλ and the coefficient of δX can be easily made to be zero (see "(4) Arm Waveguide").

(3) Splitter

The first and second splitters 10a and 10b (see FIG. 3) are realized by 2×2 MMIs, for example, as exemplified in "(2) Structure and Operations". Description will thus be made here that the first and second splitters 10a and 10b realized by 2×2 MMIs satisfy Expressions (1), (2), (4), and (5).

The ε$_1$ of the first splitter 10a realized by a 2×2 MMI is approximately −π/2. The ε$_2$ of the second splitter 10b realized by another 2×2 MMI is also approximately −π/2. Accordingly, deviation ε$_1$' of ε$_1$ from −π/2, and deviation ε$_2$' of ε$_2$ from −π/2 can be used to rewrite Expression (11) as follows.

[Math. 21]

$$\Delta\theta = \Phi + (\epsilon_1' + \epsilon_2') - \frac{\pi}{2} \quad (13)$$

Note that ε$_1$' and ε$_2$' are variables that satisfy ε$_1$=−π/2+ε$_1$' and ε$_2$=−π/2+ε$_2$'.

Figure 5:
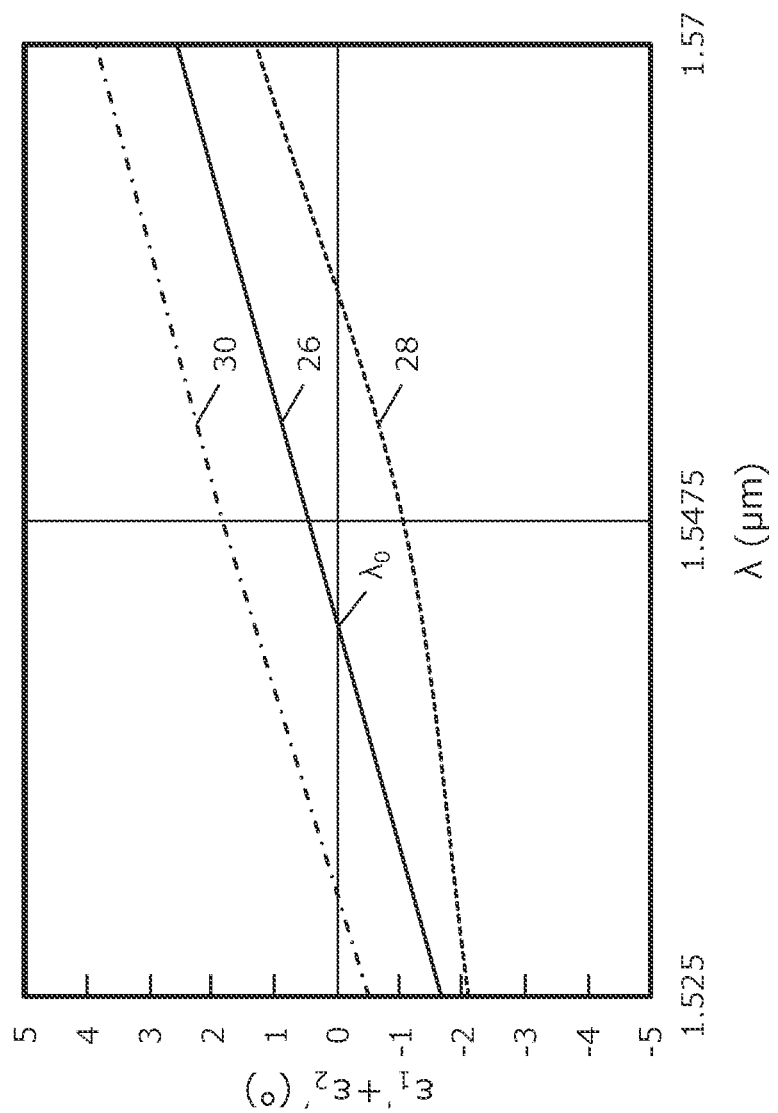
FIG. 5 is a diagram illustrating an example of the relation between $\epsilon_1' + \epsilon_2'$ and the wavelength $\lambda$.

FIG. 5 is a diagram illustrating an example of the relation between ε$_1$'+ε$_2$' and the wavelength λ (i.e., the wavelength of the first and second input lights 16a and 16b). FIG. 5 is a graph calculated by simulation. In this simulation, the first splitter 10a and the second splitter 10b are supposed to be 2×2 MMIs having the same structure. The vertical axis is ε$_1$'+ε$_2$'. The horizontal axis is the wavelength λ. The range of the horizontal axis is a broad range (1.525 to 1.57 μm), including the C-band (the same is true for FIGS. 9 to 11). ε$_1$'+ε$_2$' is a portion of the phase error Δθ, the portion occurring in the splitters 10 (i.e., first and second splitters 10a and 10b).

Figure 6:
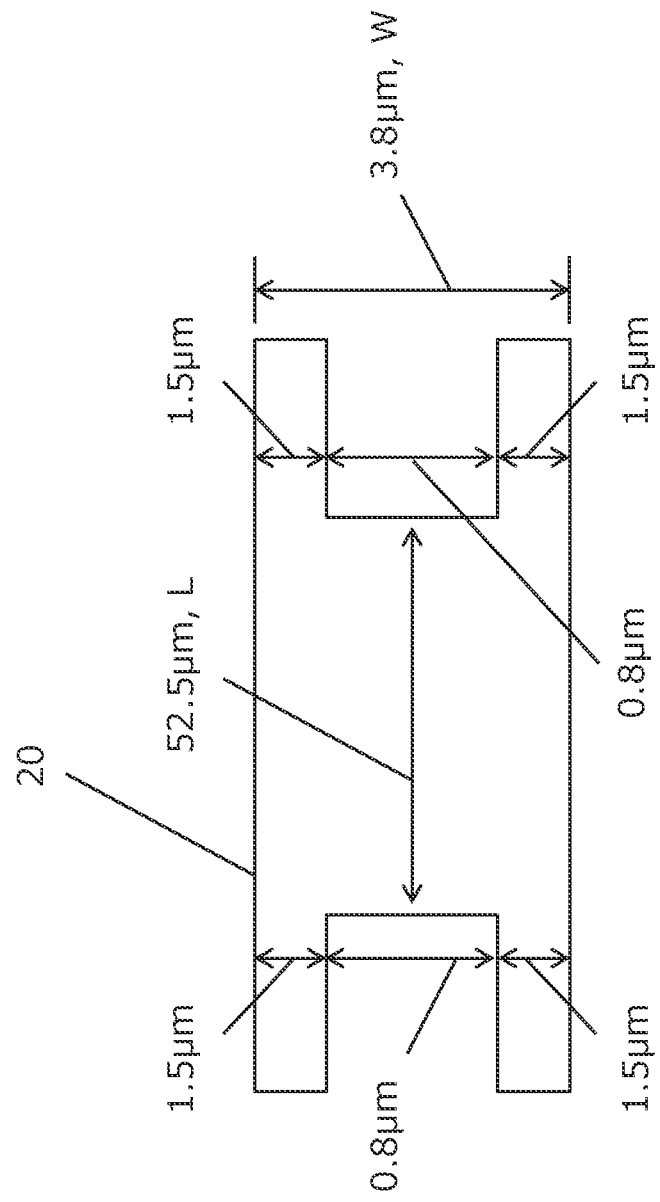
FIG. 6 is a plan view of the 2×2 MMI used for the simulation.

FIG. 6 is a plan view of the 2×2 MMIs used for the simulation. These 2×2 MMIs are channel waveguides each of which has a core made of silicon (Si) and a cladding made of silicon dioxide (SiO$_2$). The thickness of the core 20 is 220 nm. The modes of the first input light 16a and the second input light 16b are supposed to be TE0. The dimensions of each part of the core 20 are illustrated in FIG. 6.

A solid line 26 in FIG. 5 is a graph obtained in a case in which the deviation X (e.g., manufacturing error) of the width W of the core 20 is 0 nm. This graph indicates the relation between ε$_1$'+ε$_2$' and the wavelength λ (the same hereinafter). A dashed line 28 is a graph obtained in a case in which the deviation X of the width W of the core 20 is 25 nm. A chain line 30 is a graph obtained in a case in which the deviation X of the width W of the core 20 is −25 nm.

In a case in which the deviation X is 0 nm, ε$_1$'+ε$_2$' is 0° at wavelength λ$_0$ near the center wavelength 1.5475 μm on the horizontal axis, as indicated by the solid line 26. Further, in a case in which λ=λ$_0$ and X=0, the sign of the partial derivative of ε$_1$'+ε$_2$' with respect to the wavelength λ is positive, as indicated by the solid line 26.

The 2×2 MMI that realizes the first splitter 10a and the 2×2 MMI that realizes the second splitter 10b have the same structure, as described earlier, and accordingly ε$_1$' and ε$_2$' are coincident with each other. Hence, the partial derivative of ε$_1$' with respect to the wavelength λ when λ=λ$_0$ and X=0 is positive. This holds true for the partial derivative of ε$_2$' with respect to the wavelength λ as well.

Now, the partial derivative of ε$_1$' and the partial derivative of ε$_1$ are coincident with each other, which is clear from the definition of ε$_1$'. This holds true for the partial derivative of ε$_2$' as well. Accordingly, in a case in which λ=λ$_0$ and X=0, the first and second splitters 10a and 10b satisfy Expression (1) concerning the partial derivative of ε$_1$ and Expression (2) concerning the partial derivative of ε$_2$.

Further, the sign of the partial derivative of ε$_1$'+ε$_2$' with respect to deviation X is negative, which is clear from the dashed line 28 and the chain line 30. Accordingly, in a case in which λ=λ$_0$ and X=0, the first and second splitters 10a and 10b satisfy Expressions (4) and (5).

That is to say, the 2×2 MMIs can realize the splitters 10 (i.e., first and second splitters 10a and 10b) that satisfy Expressions (1), (2), (4), and (5) in a case in which λ is the certain wavelength λ$_0$ and the deviation X is 0.

Additionally, in the example illustrated in FIG. 5, Expressions (1), (2), (4), and (5) are satisfied over a broad range in which λ is no less than 1.525 nm to no more than 1.57 nm and the deviation X is no less than −25 nm to no more than 25 nm.

Wavelength Dependency of ε$_1$' and ε$_2$'

In 2×2 MMI, when the wavelength (λ in FIG. 5) of light inputted thereto departs from the optimal wavelength (λ$_0$ in the example illustrated in FIG. 5), the center of the electric field distribution formed at each output port of the 2×2 MMI shifts from the center of each output port. As a result, changes occur in the phase differences ε$_1$ and ε$_2$, each of which is the phase difference between the waveguide modes (i.e., output lights) to be emitted separately from the two output ports of the MMI. That is to say, when the wavelength λ of the input light changes, change amounts $\varepsilon_1'$ and $\varepsilon_2'$ in the phase difference $\varepsilon_1$ and $\varepsilon_2$ of output lights change from zero to a value other than zero. Here, the above "input light" is a light that is inputted into the MMI, and the above "output lights" are lights that are outputted from the MMI.

Accordingly, the partial derivative of $\varepsilon_1'$ with respect to the wavelength λ becomes a value other than zero. The same is true for the partial derivative of $\varepsilon_2'$ with respect to the wavelength λ as well. That is to say, $\varepsilon_1'$ and $\varepsilon_2'$ have wavelength dependency. Furthermore, $\varepsilon_1'$ and $\varepsilon_2'$ increase along with the wavelength λ, as illustrated in FIG. 5. Thus, $\varepsilon_1'$ and $\varepsilon_2'$ satisfy Expressions (1) and (2).

Manufacturing Error (Deviation X) Dependency of $\varepsilon_1'$ and $\varepsilon_2'$ Expression (14) is a mathematical expression that indicates an element length L (see FIG. 6) for which the loss of an MMI is minimal.

[Math. 22]

$$L = \frac{2n_r W_e^2}{\Lambda} \quad (14)$$

Note that $n_r$ is the effective refractive index of the MMI. $W_e$ is the effective core width of the MMI, and Λ is the wavelength of a light that is inputted into the MMI. Expression (14) can be readily obtained from Expressions (6) and (19) in Lucas. B. Sodano and Erik C. M. Pennings, "Optical Multi-Mode Interference Devices Based on Self-Imaging", JOURNAL OF LIGHTWAVE TECHNOLOGY, vol. 13, no. 4, April 1995, pp. 615-627. Here, the constant p in the Expression (19) is set to be 1 for obtaining the above Expression (14).

When the element length L of the MMI satisfies Expression (14), the loss becomes minimal, and also the phase difference between the waveguide modes that are emitted from the output ports becomes almost exactly −π/2. That is to say, $\varepsilon_1'$ and $\varepsilon_2'$ become almost exactly zero. Accordingly, the Λ that satisfies Expression (14) (hereinafter referred to as "zero phase-difference wavelength") is a wavelength at which $\varepsilon_1'$ and $\varepsilon_2'$ become almost exactly zero.

Many MMIs have a sufficiently large core width W (see FIG. 6), and accordingly the effective core width We and the actual width W of the MMI are approximately coincident with each other. When positive deviation X occurs in the width W, the zero phase-difference wavelength Λ shifts to the long-wavelength side, which can be clearly understood from Expression (14). Accordingly, when positive manufacturing error occurs, the solid line 26 in FIG. 5 shifts to the long-wavelength side (see dashed line 28 in FIG. 5). Conversely, when negative deviation X occurs in the width W, the zero phase-difference wavelength Λ shifts to the short-wavelength side. Accordingly, when negative manufacturing error occurs, the solid line 26 in FIG. 5 shifts to the short-wavelength side (see chain line 30 in FIG. 5).

The partial derivatives of $\varepsilon_1'$ and $\varepsilon_2'$ with respect to manufacturing error (i.e., an example of deviation X) is thus negative. That is to say, Expressions (4) and (5) concerning the deviation X are satisfied by the 2×2 MMIs.

The deviation X in the above description is the deviation of the width W of the core. However, the same conclusion is reached for other deviation X (e.g., manufacturing error in thickness T of the core or manufacturing error in sidewall angle of the core) as well.

Additionally, TE0 mode has an electric field parallel to the width direction of the core, and thus is readily affected by manufacturing error in the width direction of the core. Conversely, TM0 mode has an electric field parallel to the thickness direction of the core, and thus is readily affected by manufacturing error in the thickness direction of the core. Hence, in a case of employing TM0 mode for the first and second input lights 16a and 16b, Expressions (4) and (5) are preferably satisfied with respect to the deviation X of the thickness T of the core 20 (see FIG. 4).

(4) Arm Waveguide

The first to fourth arm waveguides 14 (see FIG. 3) are realized by channel waveguides that have phase shift portions (see Japanese Laid-open Patent Publication No. 2021-148965), for example. Description will be made here that the first to fourth arm waveguides 14 that are realized by channel waveguides with phase shift portions satisfy Expressions (3) and (6).

Figure 7:
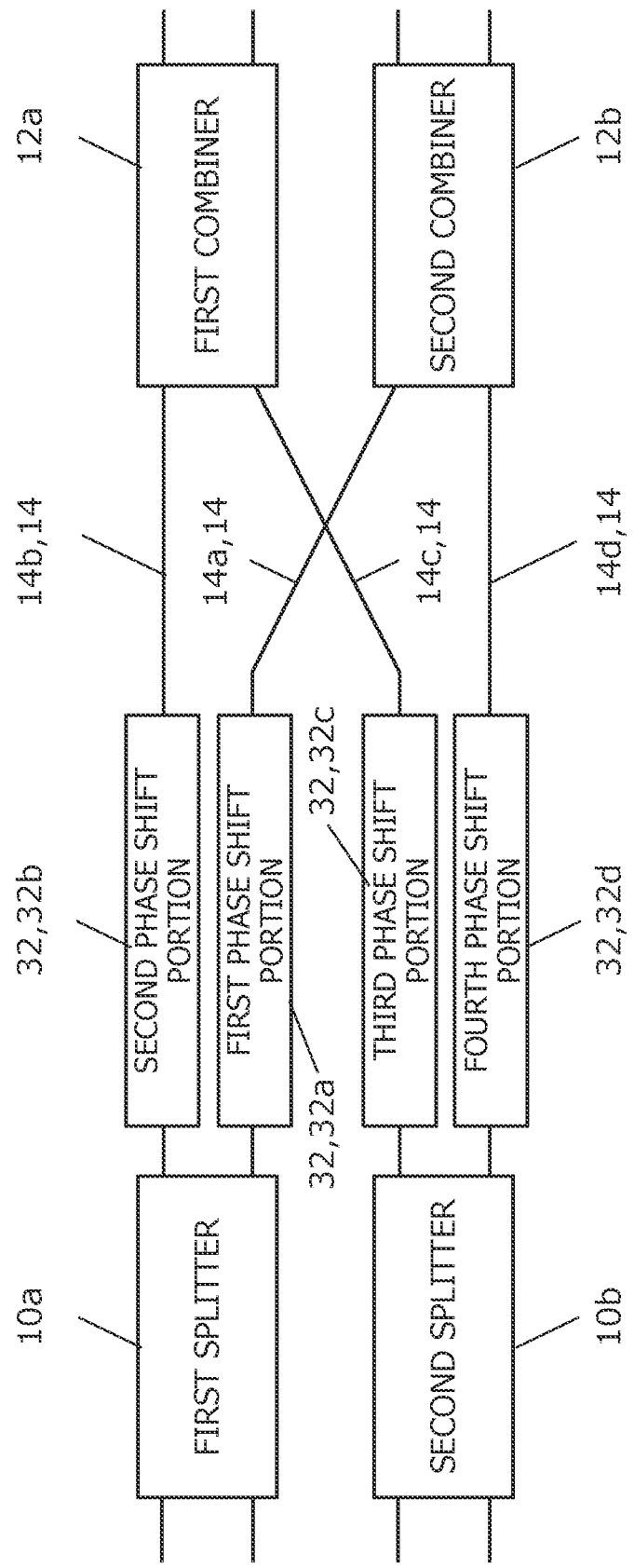
FIG. 7 is a diagram for describing the first to fourth arm waveguides 14 that have phase shift portions 32.

FIG. 7 is a diagram for describing the first to fourth arm waveguides 14 that have phase shift portions 32. Each of the phase shift portions 32 is a part of an arm waveguides (e.g., the first arm waveguide 14a), and imparts this arm waveguide 14 with an optical path length that is different from that of another arm waveguide 14 (e.g., the second arm waveguide 14b). The other portion of the arm waveguide 14 (i.e., the portion other than the phase shift portion) will be referred to as "non-phase-shift portion" hereinafter. The non-phase-shift portion of a certain arm waveguide 14 (e.g., the first arm waveguide 14a) has the same optical path length as that of each non-phase-shift portion of all other waveguides 14 (e.g., the second to fourth arm waveguides 14b, 14c, and 14d).

Figure 8:
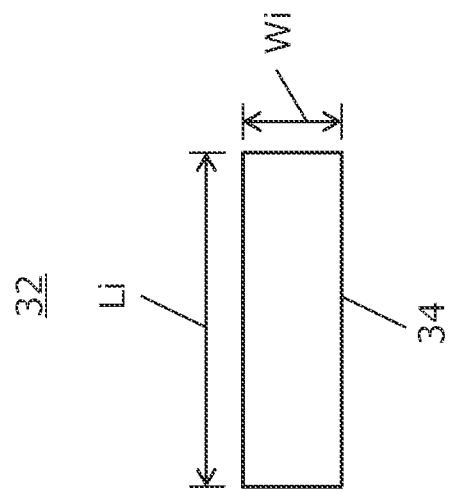
FIG. 8 is a plan view of a core 34 of an i'th phase shift portion 32.

In the following description, the phase shift portion of the first arm waveguide 14a (see FIG. 7) will be referred to as "first phase shift portion 32a". The same is true for the phase shift portions of the other arm waveguides 14. FIG. 8 is a plan view of a core 34 of an i'th (where i is an integer of 1 to 4, hereinafter the same) phase shift portion 32. The i'th phase shift portion 32 is, for example, a channel waveguide that has a width Wi and a length Li, as illustrated in FIG. 8. The core 34 is a part of the core 20 of the optical waveguide 24 described with reference to FIG. 4.

Expression (15) is an expression illustrating the phase (Di that the i'th arm waveguide (e.g., the first arm waveguide 14a) imparts to the i'th split light (e.g., the first split light 18a).

[Math. 23]

$$\Phi i = \Phi_0 + \frac{2\pi}{\lambda} N_{\mathit{eff}}(\lambda, W_i) L_i \quad (15)$$

Note that $\Phi_0$ is the phase that the non-phase-shift portion of each arm waveguide 14 (e.g., the first arm waveguide 14a) imparts to the split light propagated through that arm waveguide (e.g., the first split light 18a). $N_{\mathit{eff}}(\lambda, W_i)$ is the effective refractive index of the split light propagated through the i'th phase shift portion 32. This $N_{\mathit{eff}}(\lambda, W_i)$ is a function of the wavelength λ and the width $W_i$ of the core 34.

$N_{\mathit{eff}}(\lambda, W_i)$ can be calculated by the finite element method, for example. $N_{\mathit{eff}}(\lambda, W_i)$ is calculated on the basis of the size (e.g., width or thickness) and shape (e.g., sidewall angle) of the cross-section of the core 34, the material refractive index of the core 34, and the material refractive index of the cladding surrounding the core 34.

Substituting Φ1 to Φ4 given by Expression (15) into Expression (8) yields Expression (16). Note however, that Φ1=Φ3 and Φ2=Φ4 have been set to simplify description.

[Math. 24]

$$\Phi = \frac{4\pi}{\lambda}[N_{eff}(\lambda, W_1)L_1 - N_{eff}(\lambda, W_2)L_2] = \quad (16)$$

$$\frac{4\pi}{\lambda}L_1\left[N_{eff}(\lambda, W_1) - N_{eff}(\lambda, W_2)\left(\frac{L_2}{L_1}\right)\right]$$

Figure 9:
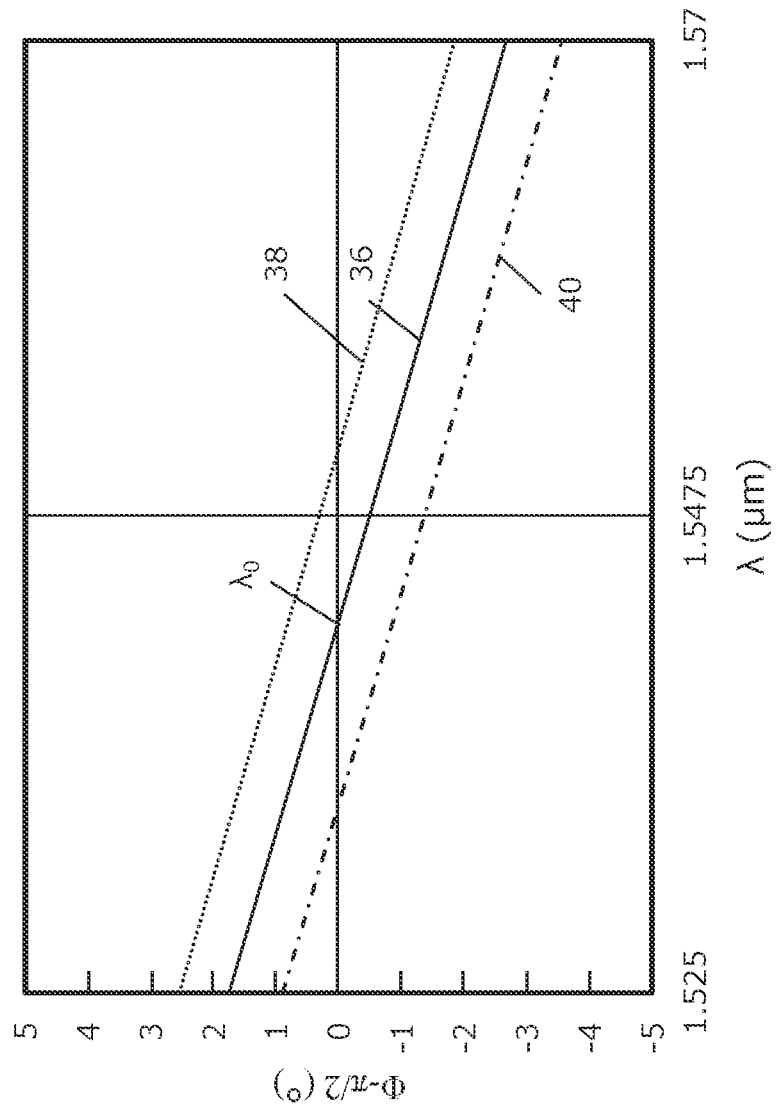
FIG. 9 is a diagram illustrating an example of the relation between $\Phi$ obtained by Expression (16), and the wavelength $\lambda$.

FIG. 9 is a diagram illustrating an example of the relation between Φ obtained by Expression (16), and the wavelength λ. FIG. 9 is a graph calculated by simulation. The vertical axis is Φ−π/2. The horizontal axis is the wavelength λ. Φ−π/2 is a part of the phase error Δθ, and the part is generated at the first to fourth arm waveguides 14a, 14b, 14c, and 14d.

The arm waveguides 14 used for the simulation in FIG. 9 are channel waveguides that have the cores made of Si and the cladding made of 902. The cores of these arm waveguides 14 have the same thickness as those of the cores of the 2×2 MMIs used for the simulation in FIG. 5 (i.e., 220 nm). The modes of the lights propagated through the arm waveguides 14 are supposed to be the modes used in the simulation in FIG. 5 (i.e., TE0). A plurality of expressions (17) indicates the dimensions of the phase shift portions 32 used for the simulation.

[Math. 25]

$W1=W3=1.136$ μm, $L1=L3=3.903$ μm $W2=W4=1.184$ μm, $L2=L4=3.825$ μm $\quad (17)$ Wi and Li in Expressions (17) are values obtained by a genetic algorithm so as to minimize the worst value (i.e., greatest value) of |Δθ|. Δθ is calculated on the basis of Expression (11), Expression (16), and the relation between $\varepsilon_1'+\varepsilon_2'$ and the wavelength λ, illustrated in FIG. 5.

Note however, that Wi and Li used to minimize the worst value are selected such that Φ−π/2 becomes zero in a case in which deviation X is zero and $\lambda=\lambda_0$. $\lambda_0$ is the wavelength described in "(3) Splitter". The range of minimizing worst values is a range that satisfies 1.525 μm 1.57 μm and also −25 nm≤X≤25 nm.

A solid line 36 in FIG. 9 is a graph obtained in a case in which the deviation X (e.g., manufacturing error) of the width Wi (see FIG. 8) of each phase shift portion is 0 nm. A dashed line 38 is a graph obtained in a case in which the deviation X of the width Wi of each phase shift portion is 25 nm. A chain line 40 is a graph obtained in a case in which the deviation X of the width Wi of each phase shift portion is −25 nm.

In a case in which the deviation X is 0 nm, Φ−π/2 is 0° at wavelength $\lambda_0$ near 1.5475 μm, which is the center wavelength of the horizontal axis, as indicated by the solid line 36. Further, in a case in which $\lambda=\lambda_0$ and X=0, the sign of the partial derivative of Φ with respect to the wavelength λ is negative, as indicated by the solid line 36.

Further, in a case in which $\lambda=\lambda_0$ and X=0, the sign of the partial derivative of Φ with respect to the deviation X is positive, which is clearly understood from the dashed line 38 and the chain line 40. Accordingly, in a case in which the wavelength $\lambda=\lambda_0$ and the deviation X=0, the arm waveguides 14 satisfy Expressions (3) and (6).

That is to say, the arm waveguides 14 that satisfy Expressions (3) and (6) in a case in which λ is the certain wavelength $\lambda_0$ and deviation X is 0 can be realized by the channel waveguides having the phase shift portions, the deviation X being the manufacturing error of the core width here. Additionally, in the example illustrated in FIG. 9, Expressions (3) and (6) are satisfied over a broad range in which λ is no less than 1.525 nm to no more than 1.57 nm and deviation X is no less than −25 nm to no more than 25 nm.

Wavelength Dependency of Φ

Expression (3) indicates the wavelength dependency that Φ satisfies. The reason why the arm waveguides 14 that have the phase shift portions 32 can satisfy Expression (3) will be described. First, partial differentiation by λ is performed for the rightmost expression in Expression (16), obtaining the partial derivative of Φ with respect to λ (i.e., the left side of Expression (3)). Expression (18) is obtained by this partial differentiation.

[Math. 26]

$$\frac{\partial \Phi}{\partial \lambda} = \frac{4\pi}{\lambda}L_1\left[\frac{\partial N_{eff}(\lambda, w_1)}{\partial \lambda} - \frac{\partial N_{eff}(\lambda, W_2)}{\partial \lambda}\left(\frac{L_2}{L_1}\right)\right] \quad (18)$$

The more the wavelength λ increases, the more the leakage of electric field to the cladding increases, which is well-known. This "electric field" means the electric field of light propagated through the core (the same hereinafter).

Accordingly, the more the wavelength λ increases, the more strongly the effective refractive index of the core is affected by the material refractive index of the cladding. The material refractive index of the cladding is lower than the material refractive index of the core. Accordingly, the more the wavelength λ increases, the more the effective refractive index of the core decreases. Thus, the partial derivative of the effective refractive index $N_{eff}(\lambda, W1)$ with respect to the wavelength λ is negative. In the same way, the partial derivative of the effective refractive index $N_{eff}(\lambda, W2)$ with respect to the wavelength λ is also negative.

The greater the cross-sectional area of the core is, the more the electric field is concentrated in the core. Thus, the greater the cross-sectional area of the core is, the smaller the decrease amount in effective refractive index due to increase in the wavelength λ is. Accordingly, Expression (19) holds in a case in which the phase shift portions 32 satisfy W1<W2.

[Math. 27]

$$\frac{\partial N_{eff}(\lambda, W_1)}{\partial \lambda} < \frac{\partial N_{eff}(\lambda, W_2)}{\delta \lambda} < 0 \quad (19)$$

In a case in which the phase shift portions 32 further satisfies L2/L1≤1, the partial derivative of Φ with respect to λ is invariably negative, which can be clearly understood from Expressions (18) and (19). That is to say, Expression (3) holds. Note however, that there are cases in which Expression (3) holds even without L2/L1≤1.

Manufacturing Error (Deviation X) Dependency of Φ

Expression (6) indicates the manufacturing error (i.e., an example of deviation X) dependency that Φ satisfies. The reason why the arm waveguides 14 that have the phase shift portions 32 can satisfy Expression (6) will be described.

First, partial differentiation by deviation w of the core width W is performed for the rightmost expression in Expression (16), obtaining the partial derivative of Φ with respect to w. Expression (20) is an expression obtained by this partial differentiation.

The deviation w is a form of the deviation X. The deviation of the width W of the core will be expressed by "w" in the description relating to Expression (20), to avoid confusion.

[Math. 28]

$$\frac{\partial \Phi}{\partial w} = \frac{4\pi}{\lambda} L_1 \left[ \frac{\partial N_{eff}(\lambda, W_1)}{\partial w} - \frac{\partial N_{eff}(\lambda, w_2)}{\partial w} \left( \frac{L_2}{L_1} \right) \right] \quad (20)$$

The greater the cross-sectional area of the core is, the stronger the confinement of the electric field to the core is, which is well-known. Accordingly, the greater the cross-sectional area of the core is, the more strongly the effective refractive index of the core is affected by the material refractive index of the core. The material refractive index of the core is higher than the material refractive index of the cladding, and accordingly, the more the deviation w (i.e., the change amount of the width W) increases, the more the effective refractive index of the core increases. Thus, the partial derivative of the effective refractive index $N_{eff}(\lambda, W1)$ with respect to the deviation w is positive. In the same way, the partial derivative of the effective refractive index $N_{eff}(\lambda, W2)$ with respect to the deviation w is positive.

The greater the cross-sectional area of the core (hereinafter referred to as core cross-sectional area) is, and the more the electric field is concentrated in the core. Thus, the greater the core cross-sectional area is, the less electric field additionally leaks out from the core. Accordingly, the greater the core cross-sectional area is, the smaller the increase in effective refractive index due to the increase in the core cross-sectional area is. Thus, Expression (21) holds in a case in which the phase shift portions 32 satisfy W1<W2.

[Math. 29]

$$\frac{\partial N_{eff}(\lambda, W_1)}{\partial w} > \frac{\partial N_{eff}(\lambda, W_2)}{\partial w} > 0 \quad (21)$$

In a case in which the phase shift portions 32 further satisfy L2/L1≤1, the partial derivative of Φ with respect to w (i.e., the left side of Expression (20)) is invariably positive, which can be clearly understood from Expressions (20) and (21). The deviation w is a form of the deviation X of the structural parameter, and accordingly Expression (6) holds when L2/L1≤1 holds. Note however, that there are cases in which Expression (6) holds even without L2/L1≤1 holding.

W1<W2 and L2/L1≤1 are the same as the condition for Expression (3) to hold (see "Wavelength Dependency of Φ").

(5) Phase Error Δθ

Figure 10:
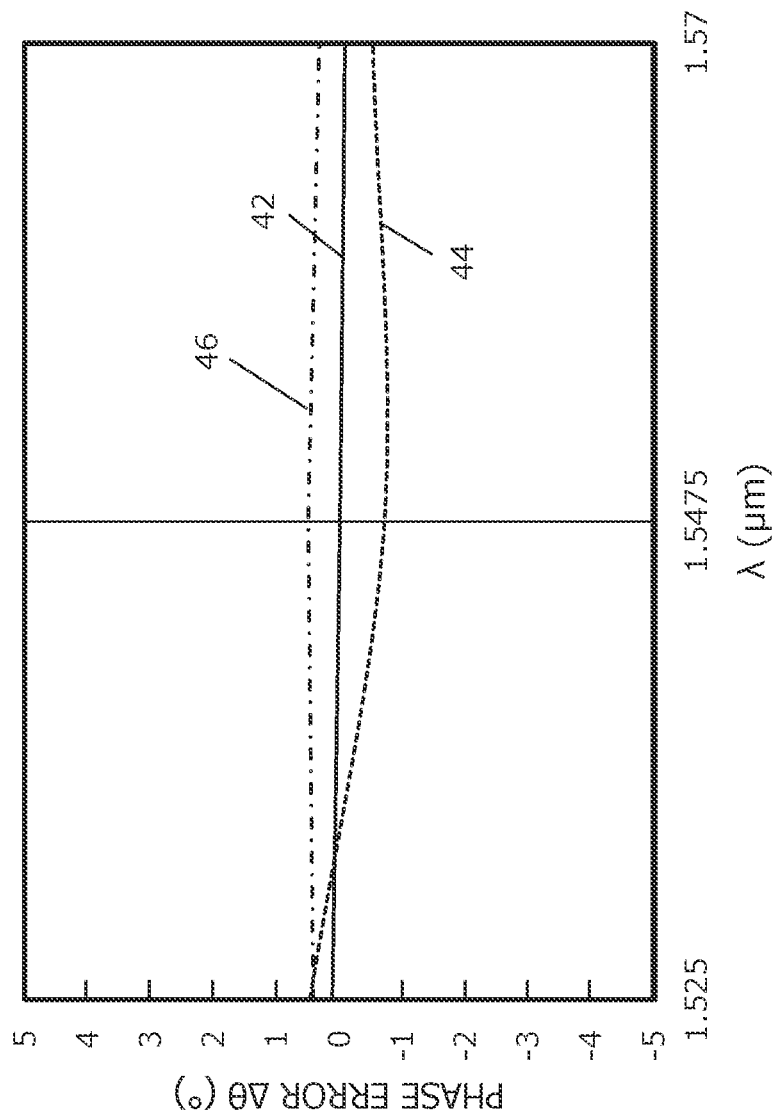
FIG. 10 is a diagram illustrating an example of the relation between the phase error $\Delta\theta$ and the wavelength $\lambda$.

The phase error Δθ in an optical 90-degree hybrid that has the splitters 10 realized by 2×2 MMIs (See "(3) Splitter") and the arm waveguides 14 realized by channel waveguides having phase shift portions (see "(4) Arm Waveguide") will be described. FIG. 10 is a diagram illustrating an example of the relation between the phase error Δθ (see Expression (13)) and the wavelength λ. The vertical axis is the phase error Δθ. The horizontal axis is the wavelength λ. FIG. 10 is a graph calculated by simulation.

The splitters 10 (see FIG. 3) used for the simulation are the 2×2 MMIs used for the simulation in FIG. 5. The arm waveguides 14 (see FIG. 7) used for the simulation are the channel waveguides used for the simulation in FIG. 9.

A solid line 42 in FIG. 10 is a graph obtained in a case in which the deviation X (e.g., manufacturing error) of the core width of each splitter 10 and each arm waveguide 14 is 0 nm. A dashed line 44 is a graph obtained in a case in which this deviation X is 25 nm. A chain line 46 is a graph obtained in a case in which this deviation X is −25 nm.

In a case in which the deviation X is 0 nm, the phase error Δθ is approximately zero over a broad wavelength range on the horizontal axis (1.525 µm to 1.57 µm), as indicated by the solid line 42. Further, even in a case in which the deviation X of the core width is ±25 nm, the phase error Δθ in the wavelength range indicated by the horizontal axis is ±0.72° at the most, as indicated by the dashed line 44 and the chain line 46. This value is sufficiently smaller than the permissible range of variation for the phase error Δθ of the optical 90-degree hybrid, the permissible range being ±5°.

Thus, according to the embodiment, increase in the phase error Δθ (more accurately, increase in absolute value of Δθ) due to the deviation X of the structural parameter increasing (more accurately, the absolute value of the deviation X increasing) can be suppressed, while suppressing increase in the phase error Δθ (more accurately, increase in absolute value of Δθ) due to change in wavelength. Here, an example of the deviation X is manufacturing error.

Figure 11:
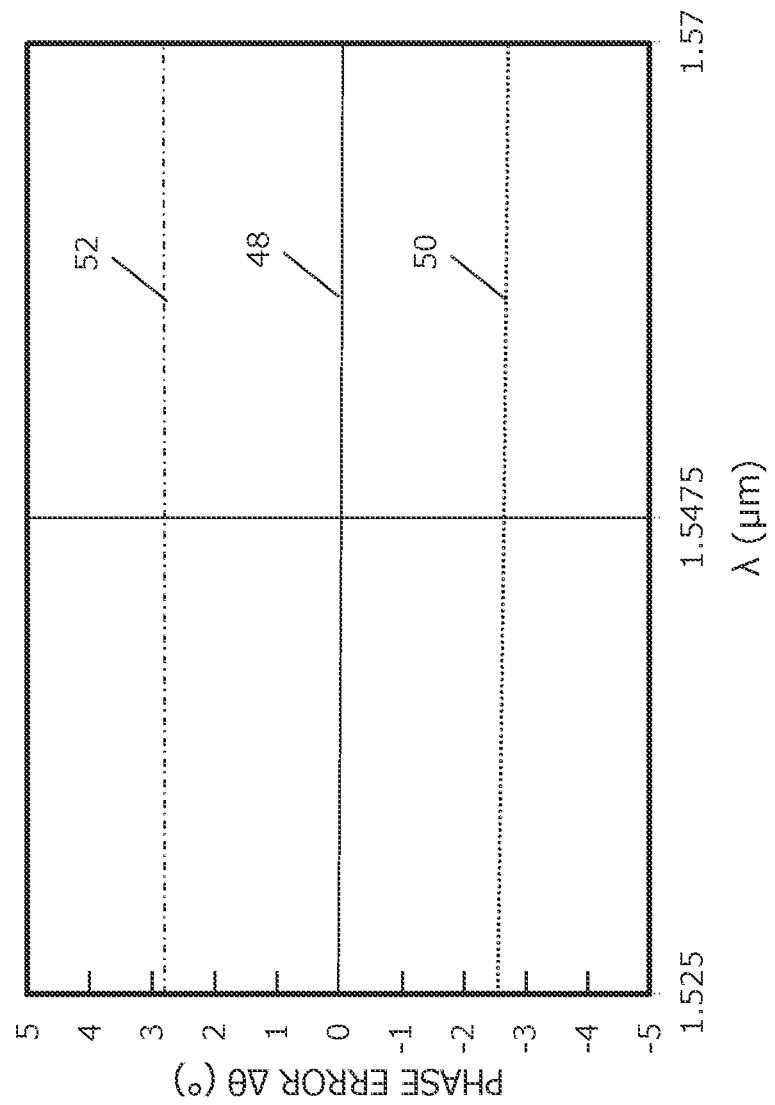
FIG. 11 is a diagram illustrating an example of the relation between the phase error $\Delta\theta$ and the wavelength $\lambda$ for an optical 90-degree hybrid in which the first and second splitters 10a and 10b are 1×2 MMIs.

FIG. 11 is a diagram illustrating an example of the relation between the phase error Δθ and the wavelength λ for an optical 90-degree hybrid in which the first and second splitters 10a and 10b are 1×2 MMIs. The vertical axis is the phase error Δθ. The horizontal axis is the wavelength λ.

A solid line 48 in FIG. 11 is a graph obtained in a case in which the deviation X of the core width is 0 nm. A dashed line 50 is a graph obtained in a case in which the deviation X of the core width is 25 nm. A chain line 52 is a graph obtained in a case in which the deviation X of the core width is −25 nm.

In a case in which the deviation X of the core width is 0 nm, the phase error Δθ is approximately zero over a broad wavelength range on the horizontal axis (1.525 µm to 1.57 µm), as indicated by solid line 48. However, in a case in which the deviation X (e.g., manufacturing error) of the core width is 25 nm, phase error Δθ of −2.7° occurs, as indicated by the dashed line 50. And, in a case in which the deviation X of the core width is −25 nm, phase error Δθ of 2.8° occurs, as indicated by the chain line 52. The reason is that the first and second splitters 10a and 10b that are formed of 1×2 MMIs do not satisfy Expressions (4) and (5).

(6) Method of Use

The optical 90-degree hybrid 8 according to the embodiment is used in a quadrature phase-shift keying (QPSK) receiver, for example. Specifically, the reference light LO is inputted to the first splitter 10a (see FIG. 3), and phase-modulated signal light S is inputted to the second splitter 10b. The reference light LO is a light that has approximately the same wavelength as that of the signal light S. The phase of the signal light S is modulated at four values of which intervals are 90° (i.e., 0°, 90°, 180°, and 270°).

The first splitter 10a splits the reference light LO and inputs the splitted reference light LO into the first and second combiners 12a and 12b via the first and second arm waveguides 14a and 14b. In the same way, the second splitter 10b splits the signal light S and inputs the splitted signal light S into the first and second combiners 12a and 12b via the third and fourth arm waveguides 14c and 14d. The first and second combiners 12a and 12b each mix the splitted reference light LO and the splitted signal light S, and output the four interference lights In, Ip, Qn, and Qp with phase intervals of 90°.

The interference light In and the interference light Ip are inputted to a balanced photodetector (omitted from illustration) and are converted into a first electrical signal. The interference light Qn and the interference light Qp are inputted to a different balanced photodetector (omitted from illustration) and are converted into a second electrical signal. Two orthogonal transmission signals are demodulated from the first and second electrical signals.

The reference light LO is inputted to the first splitter 10a and the signal light S is inputted to the second splitter 10b in the above example. However, the signal light S may be inputted to the first splitter 10a and the reference light LO is inputted to the second splitter 10b as well.

(7) Manufacturing Method

Figure 12:
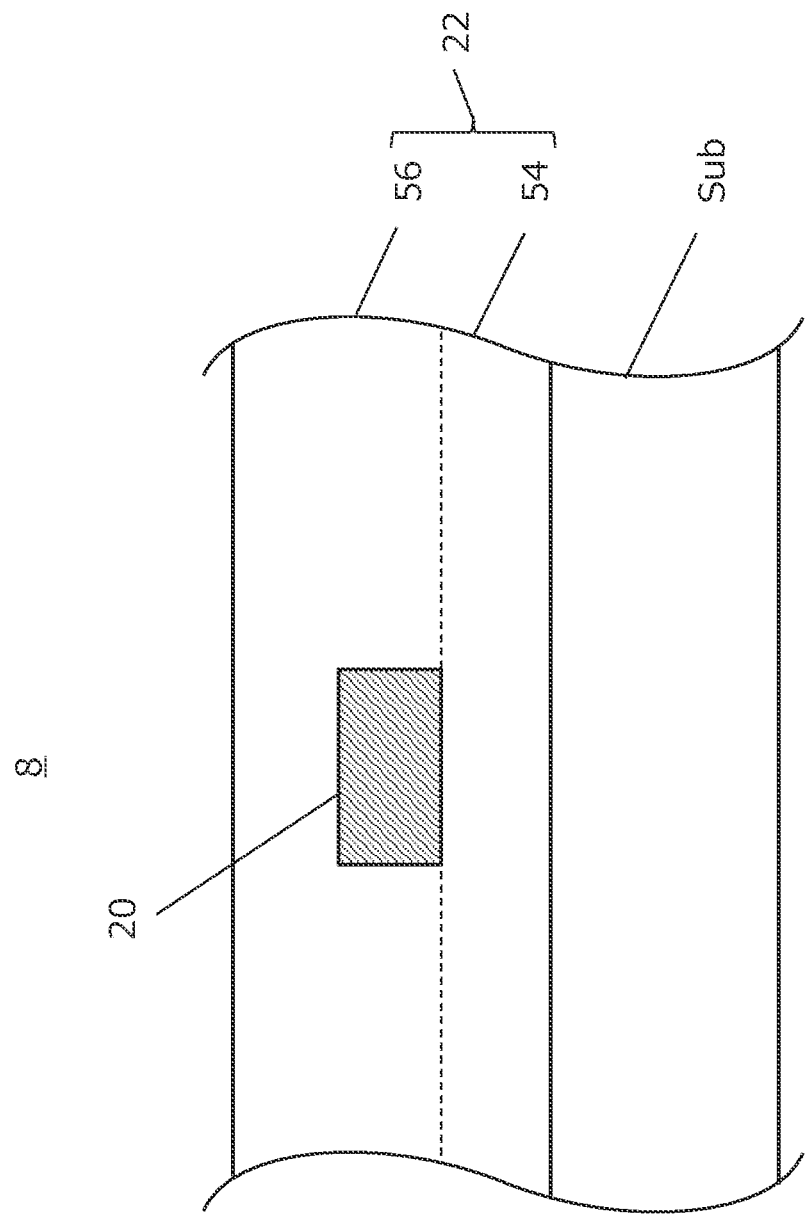
FIG. 12 is a diagram for describing an example of a manufacturing method of the optical 90-degree hybrid 8 according to the embodiment.

FIG. 12 is a diagram for describing an example of a manufacturing method of the optical 90-degree hybrid 8 according to the embodiment. FIG. 12 is a cross-sectional view taken along line IV, XII-IV, XII in FIG. 2. The optical 90-degree hybrid 8 has the core 20 and the cladding 22 surrounding the core, as described with reference to FIG. 4. The cladding 22 has, for example, a lower cladding layer 54 and an upper cladding layer 56.

First, an upper-portion Si layer of a silicon on insulator (SOI) wafer is partially etched, so that the core 20 is formed. Further, a $SiO_2$ film is deposited on the SOI wafter that has the formed core 20, thereby forming the upper cladding layer 56. The optical 90-degree hybrid 8 is formed by the above processes. The lower cladding layer 54 is a buried oxide (BOX) layer of the SOI wafer.

(8) Modifications

Figure 13:
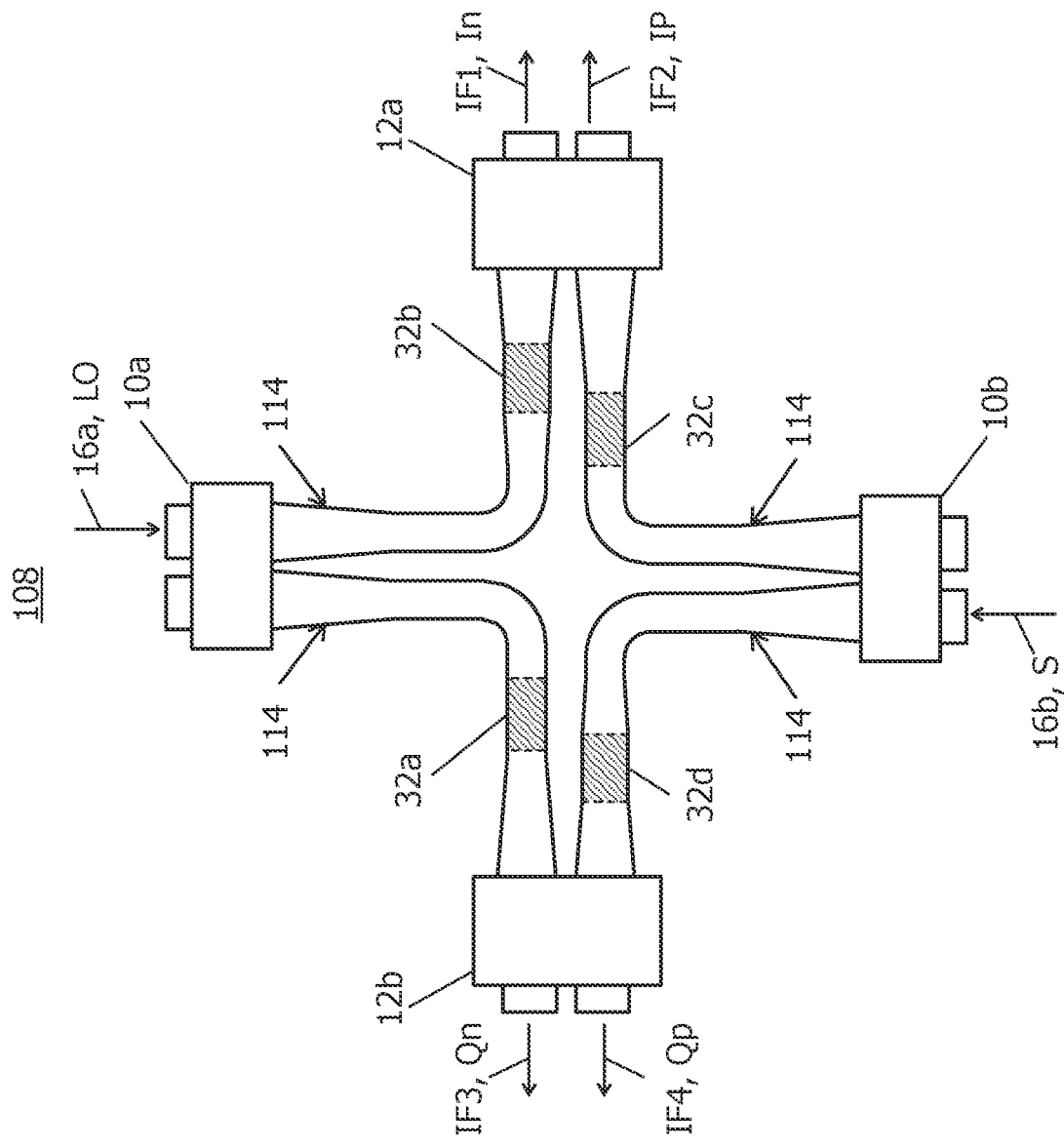
FIG. 13 is a plan view of a modification 108 of the optical 90-degree hybrid 8.

FIG. 13 is a plan view of a modification 108 of the optical 90-degree hybrid 8. The structure of the modification 108 is similar to that of the optical 90-degree hybrid 8 described with reference to FIGS. 2 and 3. Accordingly, description of portions that are in common with those of the optical 90-degree hybrid 8 will be omitted or simplified.

The optical 90-degree hybrid 8 described with reference to FIGS. 2 and 3 has the first and third arm waveguides 14a and 14c that cross each other (see FIG. 3). Conversely, the modification 108 has four arm waveguides 114 that are bent at 90° at its middle. Split lights of the first input light 16a and split lights of the second input light 16b are inputted to the first and second combiners 12a and 12b by these four arm waveguides 114 in the modification 108.

According to the modification 108, the arm waveguides 114 do not cross each other, and accordingly occurrence of crossing loss (i.e., loss occurring at a crossing portion of optical waveguides) can be avoided. Further, according to the modification 108, crosstalk can be avoided from occurring at the crossing portion of the arm waveguides.

Forming the cores of the arm waveguides 114 of Si (or SiN) and forming the cladding of $SiO_2$ yields a larger relative refractive index difference between the cladding and the cores, and accordingly the curvature radius of the bent portions of the arm waveguides 114 can be made smaller. Such a configuration enables propagation loss at the arm waveguides 114 to be further suppressed, since reduction in size of the arm waveguides 114 is facilitated.

The optical 90-degree hybrid 8 according to the embodiment is configured such that phase error ($\varepsilon_1' + \varepsilon_2'$) occurring at the splitters 10 is cancelled out by the phase error ($\Phi - \pi/2$) occurring at the arm waveguides, as described with reference to FIGS. 2 to 10. Thus, according to the embodiment, increase in phase error $\Delta\theta$ (more accurately, increase in absolute value of $\Delta\theta$) due to increase in deviation in structural parameters (more accurately, increase in absolute value of deviation) can be suppressed, while suppressing increase in the phase error $\Delta\theta$ (more accurately, increase in absolute value of $\Delta\theta$) due to wavelength change.

Although an embodiment of the present invention has been described above, the embodiment is exemplary, and not restrictive. For example, the first and second splitters 10a and 10b may be optical elements other than 2×2 MMIs. The first and second splitters 10a and 10b may be a splitter disclosed in Weijie Chang, et al., "Inverse design and demonstration of an ultracompact broadband dual-mode 3 dB power splitter", Optics Express, Vol. 26, No. 18, 2018, pp. 24135-24144, for example, which discloses a splitter in which wavelength dependance of loss is controllable by providing a plurality of holes in the core. This splitter also enables control of phase among the output ports.

Each of the phase shift portions 32 according to the embodiment is a linear waveguide that has a core with constant width. However, each of the phase shift portions 32 may be an optical waveguide other than a linear waveguide. For example, each of the phase shift portions 32 may be a tapered optical waveguide that has a core of which the width gradually increases or decreases.

The optical waveguide 24 according to the embodiment is an optical waveguide based on silicon photonics. However, the optical waveguide 24 may be an optical waveguide based on a technology other than silicon photonics. For example, the optical waveguide 24 may be an optical waveguide based on a planar lightwave circuit (PLC) in which both the core 20 and the cladding 22 are formed of $SiO_2$. Alternatively, the optical waveguide 24 may be an indium phosphide (InP) waveguide or a gallium arsenide (GaAs) waveguide. Alternatively, the optical waveguide 24 may be an optical waveguide of which the core 20 is made of SiN. In this case, the lower cladding layer 54 is made of $SiO_2$, for example, and the upper cladding layer 56 is made of $SiO_2$ or air. Alternatively, the optical waveguide 24 may be an optical waveguide from which the upper cladding layer 56 is omitted in the optical waveguide described with reference to FIG. 12 (i.e., an optical waveguide in which the upper cladding layer 56 is formed of air).

The optical waveguide 24 according to the embodiment is a channel waveguide. However, the optical waveguide 24 may be an optical waveguide other than a channel waveguide. For example, the optical waveguide 24 may be any one of a rib waveguide, a high-mesa waveguide, and a ridge waveguide.

Confinement of light to the core is strong in channel waveguides, and accordingly the curvature radius of the bent portions of the arm waveguides 114 is readily made small. Part of light propagated through the core leaks out from a thick rib portion to a thin slab portion in rib waveguides, and thus is not readily affected by sidewall roughness of the core. Accordingly, rib waveguides can reduce loss at the arm waveguides 14.

The arm waveguides 14 according to the embodiment described with reference to FIG. 2 cross at one location. However, the arm waveguides 14 may cross at a plurality of locations. Such a configuration enables the arm waveguides 14 to be made shorter, and thus loss at the arm waveguides 14 can be reduced.

The deviation X is manufacturing error in the embodiment. However, the deviation X does not have to be manufacturing error. For example, the arm waveguides 14 and so forth may be designed such that the phase error $\Delta\theta$ is a value other than zero (e.g., 0.05°) in a case in which the structural parameter takes a design value and $\lambda$ is a certain wavelength $\lambda_0$. In such a case, the deviation X is not manufacturing error, but deviation from a structural parameter value (i.e., a value of the structural parameter) with respect to which the phase error $\Delta\theta$ becomes zero at the certain wavelength $\lambda_0$.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An optical 90-degree hybrid comprising:
   a first splitter that has a first output port, and a second output port that is different from the first output port, the first splitter being a 2×2 multimode interferometer;
   a second splitter that is different from the first splitter and that has a third output port, and a fourth output port that is different from the third output port, the second splitter being another 2×2 multimode interferometer;
   a first combiner that has a first input port, and a second input port that is different from the first input port;
   a second combiner that is different from the first combiner and that has a third input port, and a fourth input port that is different from the third input port;
   a first arm waveguide that connects the first output port and the third input port;
   a second arm waveguide that connects the second output port and the second input port;
   a third arm waveguide that connects the third output port and the first input port; and
   a fourth arm waveguide that connects the fourth output port and the fourth input port, wherein
   the first splitter splits a first light into a first split light and a second split light, outputs the first split light from the first output port, and outputs the second split light from the second output port,
   the second splitter splits a second light into a third split light and a fourth split light, outputs the third split light from the third output port, and outputs the fourth split light from the fourth output port,
   the first combiner combines the second split light that enters thereto via the second arm waveguide and the third split light that enters thereto via the third arm waveguide so as to generate a first interference light and a second interference light that is opposite in phase to the first interference light,
   the second combiner combines the fourth split light that enters thereto via the fourth arm waveguide and the first split light that enters thereto via the first arm waveguide so as to generate a third interference light and a fourth interference light that is opposite in phase to the third interference light,
   each of the first and second splitters, the first to fourth arm waveguides, and the first and second combiners is a part of an optical waveguide that has a core and a cladding that surrounds the core,
   the first output port is a cross port to an input port to which the first light enters,
   the second output port is a through port to the input port to which the first light enters,
   the third output port is a cross port to an input port to which the second light enters,
   the fourth output port is a through port to the input port to which the second light enters, and
   the optical waveguide is configured to satisfy following Expressions (1) to (4), $$\frac{\partial \Phi}{\partial \lambda} < 0 \qquad (1)$$

$$\frac{\partial \Phi}{\partial \lambda} > 0 \qquad (2)$$

$$= (k+2) \times \pi/2 + 2m\pi \qquad (3)$$

$$\Phi = (\Phi 1 - \Phi 4) - (\Phi 2 - \Phi 3) \qquad (4)$$

where $\lambda$ is a wavelength of the first light and the second light, X is deviation of width of the core, $\Phi 1$ is a phase imparted to the first split light by the first arm waveguide, $\Phi 2$ is a phase imparted to the second split light by the second arm waveguide, $\Phi 3$ is a phase imparted to the third split light by the third arm waveguide, $\Phi 4$ is a phase imparted to the fourth split light by the fourth arm waveguide, m is an integer, k is either +1 or −1, and a unit of phases is radian.

2. The optical 90-degree hybrid according to claim 1, wherein each of the first combiner and the second combiner is a 2×2 multimode interferometer.

3. An optical 90-degree hybrid comprising:
   a first splitter that has a first output port, and a second output port that is different from the first output port, the first splitter being a 2×2 multimode interferometer;
   a second splitter that is different from the first splitter and that has a third output port, and a fourth output port that is different from the third output port, the second splitter being another 2×2 multimode interferometer;
   a first combiner that has a first input port, and a second input port that is different from the first input port;
   a second combiner that is different from the first combiner and that has a third input port, and a fourth input port that is different from the third input port;
   a first arm waveguide that connects the first output port and the third input port, having a first phase shift portion;
   a second arm waveguide that connects the second output port and the second input port, having a second phase shift portion;
   a third arm waveguide that connects the third output port and the first input port, having a third phase shift portion; and
   a fourth arm waveguide that connects the fourth output port and the fourth input port, having a fourth phase shift portion, wherein the first splitter splits a first light into a first split light and a second split light, outputs the first split light from the first output port, and outputs the second split light from the second output port, the second splitter splits a second light into a third split light and a fourth split light, outputs the third split light from the third output port, and outputs the fourth split light from the fourth output port, the first combiner combines the second split light that enters thereto via the second arm waveguide and the third split light that enters thereto via the third arm waveguide so as to generate a first interference light and a second interference light that is opposite in phase to the first interference light, the second combiner combines the fourth split light that enters thereto via the fourth arm waveguide and the first split light that enters thereto via the first arm waveguide so as to generate a third interference light and a fourth interference light that is opposite in phase to the third interference light, each of the first and second splitters, the first to fourth arm waveguides, and the first and second combiners is a part of an optical waveguide that has a core and a cladding that surrounds the core, the first output port is a cross port to an input port to which the first light enters, the second output port is a through port to the input port to which the first light enters, the third output port is a cross port to an input port to which the second light enters, the fourth output port is a through port to the input port to which the second light enters, and the optical waveguide is configured to satisfy following Expressions (1) to (4), $$\frac{\partial \Phi}{\partial \lambda} < 0 \quad (1)$$

$$\frac{\partial \Phi}{\partial X} > 0 \quad (2)$$

$$\Phi = (k+2) \times \pi/2 + 2m\pi \quad (3)$$

$$\Phi = (\Phi 1 - \Phi 4) - (\Phi 2 - \Phi 3) \quad (4)$$

where λ is a wavelength of the first light and the second light, X is deviation of width of the core, Φ1 is a phase imparted to the first split light by the first phase shift portion, Φ2 is a phase imparted to the second split light by the second phase shift portion, Φ3 is a phase imparted to the third split light by the third phase shift portion, Φ4 is a phase imparted to the fourth split light by the fourth phase shift portion, m is an integer, k is either +1 or −1, and a unit of phases is radian.

4. An optical 90-degree hybrid comprising:

a first splitter that has a first output port, and a second output port that is different from the first output port, the first splitter being a 2×2 multimode interferometer;

a second splitter that is different from the first splitter and that has a third output port, and a fourth output port that is different from the third output port, the second splitter being another 2×2 multimode interferometer;

a first combiner that has a first input port, and a second input port that is different from the first input port;

a second combiner that is different from the first combiner and that has a third input port, and a fourth input port that is different from the third input port;

a first arm waveguide that connects the first output port and the third input port, having a first phase shift portion that has a first width and a first length;

a second arm waveguide that connects the second output port and the second input port, having a second phase shift portion that has a second width and a second length;

a third arm waveguide that connects the third output port and the first input port, having a third phase shift portion that has a third width and a third length; and a fourth arm waveguide that connects the fourth output port and the fourth input port, having a fourth phase shift portion that has a fourth width and a fourth length, wherein the first splitter splits a first light into a first split light and a second split light, outputs the first split light from the first output port, and outputs the second split light from the second output port, the second splitter splits a second light into a third split light and a fourth split light, outputs the third split light from the third output port, and outputs the fourth split light from the fourth output port, the first combiner combines the second split light that enters thereto via the second arm waveguide and the third split light that enters thereto via the third arm waveguide so as to generate a first interference light and a second interference light that is opposite in phase to the first interference light, the second combiner combines the fourth split light that enters thereto via the fourth arm waveguide and the first split light that enters thereto via the first arm waveguide so as to generate a third interference light and a fourth interference light that is opposite in phase to the third interference light, each of the first and second splitters, the first to fourth arm waveguides, and the first and second combiners is a part of an optical waveguide that has a core and a cladding that surrounds the core, the first output port is a cross port to an input port to which the first light enters, the second output port is a through port to the input port to which the first light enters, the third output port is a cross port to an input port to which the second light enters, the fourth output port is a through port to the input port to which the second light enters, and a phase imparted to the first split light by the first arm waveguide is a sum of a phase imparted to the first split light by the first phase shift portion and a certain phase, a phase imparted to the second split light by the second arm waveguide is a sum of a phase imparted to the second split light by the second phase shift portion and the certain phase, a phase imparted to the third split light by the third arm waveguide is a sum of a phase imparted to the third split light by the third phase shift portion and the certain phase, a phase imparted to the fourth split light by the fourth arm waveguide is a sum of a phase imparted to the fourth split light by the fourth phase shift portion and the certain phase, the first width is shorter than the second width, the second length is shorter than or equal to the first length, the third width is shorter than the fourth width, and the fourth length is shorter than or equal to the third length.

\* \* \* \* \*